3,544,309
RECOVERY OF CONSTITUENTS FROM METAL ALLOY SCRAP

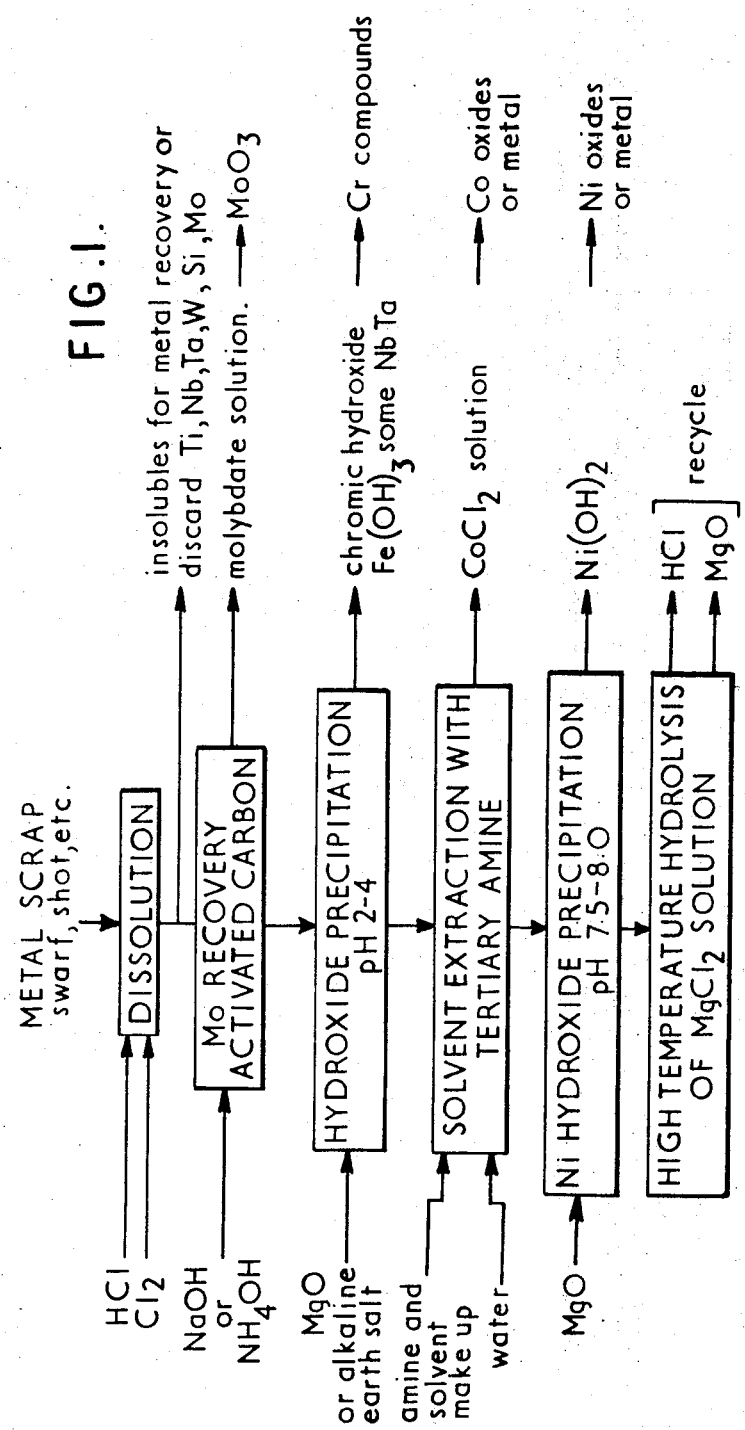
FIG.I.

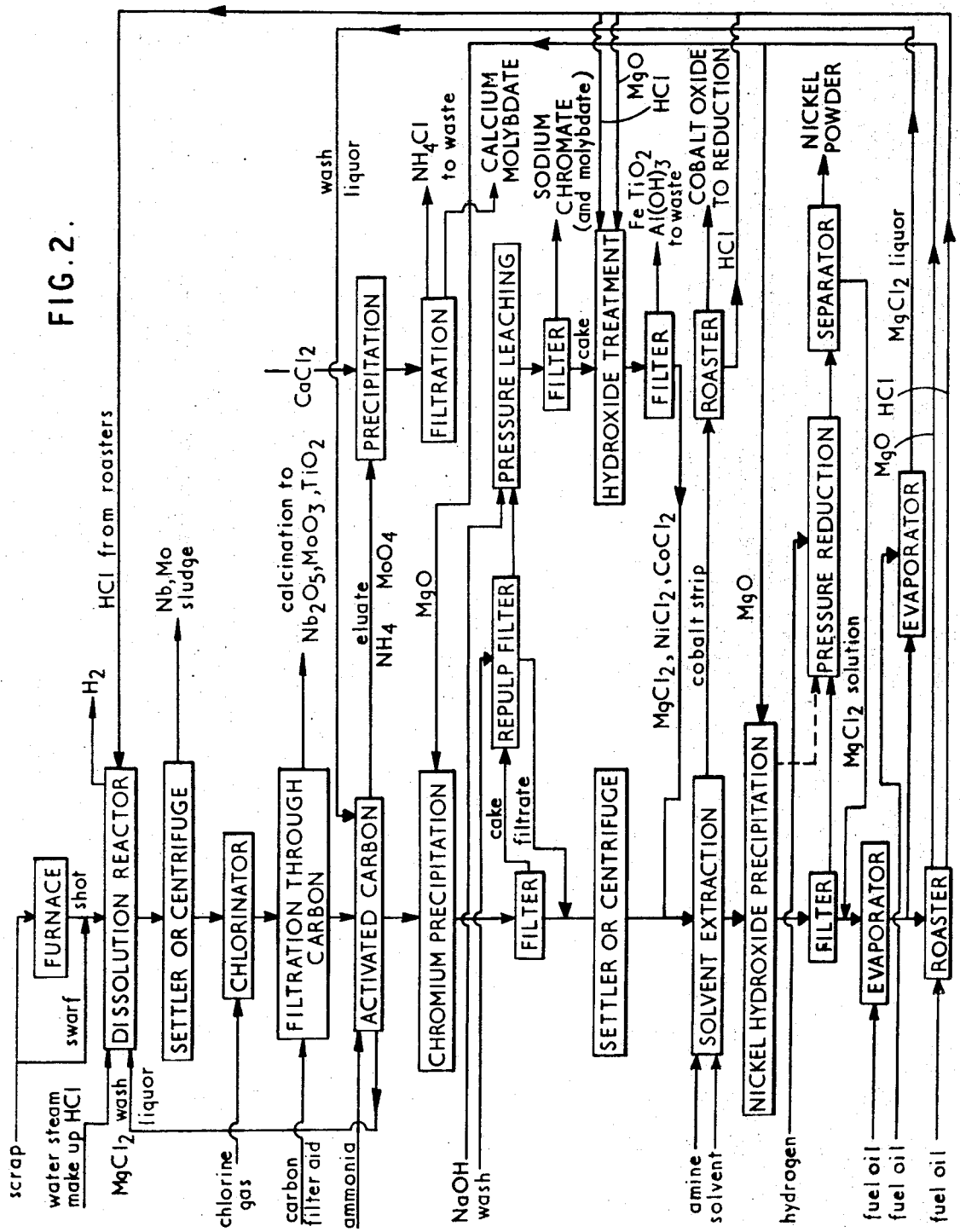

Archibald William Fletcher, Eric Raymond Baggott, and Raymond Derry, Stevenage, England, assignors to Brandhurst Company Limited, London, England, and Charter Consolidated Limited, London, England, a British company
Filed Nov. 6, 1967, Ser. No. 680,743
Claims priority, application Great Britain, Nov. 14, 1966, 50,975/66
Int. Cl. C22b 23/00; C01g 1/06, 37/02
U.S. Cl. 75—108     5 Claims

ABSTRACT OF THE DISCLOSURE

The constituents of nickel alloy scrap (particularly of Nimonic alloys) are recovered by dissolving the scrap in HCl and/or chlorine gas in aqueous medium and separating the constituents by wet chemical methods. A particular flow process is described which includes removal of molybdenum by absorption on active carbon, precipitation of chromium and iron (if any) as hydroxides by addition of MgO, removal of cobalt by solvent extraction precipitation of nickel hydroxide by MgO, and regeneration of HCl and MgO.

---

This invention concerns the recovery of constituents from metal alloy scrap and is more particularly concerned with recovery from scrap in which nickel is a major constituent.

The types of alloy in relation to which the invention has been more especially conceived include the series of high-temperature creep-resistant alloys known as Nimonic alloys, although other materials of similar chemical composition may be equally suitable for processing in accordance with the invention. More generally, the invention concerns nickel alloys in which other principal constituents may include cobalt, molybdenum and chromium and minor amounts of titanium, silicon, manganese, iron, tungsten, niobium and/or copper.

Although the composition of the nickel alloy scrap is not critical to the method of the invention, the alloy scrap may suitably contain at least 45% nickel, particularly about 50–65% nickel. Other constituents may include 10–27%, particularly about 19% chromium
2–22%, particularly about 16%, cobalt
0–11%, particularly about 5%, molybdenum
0–5%, particularly about 2%, iron
0.2–6, particularly about 2%, aluminium
0.5–4.5%, particularly about 0.7%, titanium
0.2–1%, particularly about 0.6%, manganese
0.2–1.5%, particularly about 0.7%, silicon
0–8%, for example about 1%, tungsten
0.06–0.5%, particularly about 0.2%, carbon
0–0.5%, for example about 0.03, copper
0–5%, for example about 1.73% niobium.

The iron content may be increased up to about 8% by addition of alloy scrap having a substantially higher iron content.

The invention is particularly concerned with the recovery of nickel, chromium, molybdenum and cobalt.

The economic incentives for the treatment of such alloys are particularly attractive in as far as the scrap value is invariably low in relation to the intrinsic value of the alloy constituents. However, there does not appear to have previously been any coherent or general approach to proposing such treatment and this may arise from the fact that, apart from the variation of chemical composition from one alloy to another, there is considerable variation in the form of scrap as to physical form and contaminants dependent on the source of the scrap.

The scrap will vary in dependence upon the mode of working from which the scrap derives, and these modes may include mechanical machining such as turning, milling and drilling, casting, grinding and electrochemical machining. The scrap may therefore be in variable physical form from a liquor or sludge, through fine particulate form, up to larger solid form including rejected or worn-out components; and it may be contaminated with foreign material such as abrasives or grinding media, casting sand, or metallic contaminants such as steel scrap. The metallic values may be present as metal compounds, such as hydroxides or basic salts, particularly in the case of sludges from electrochemical machining and pickle liquors.

The scrap may require pretreatment in order to put it into suitable physical form for dissolution. Such pretreatment must not be such as to increase the carbon or nitrogen content which would render the scrap insoluble.

Liquors derived from electrochemical machining techniques, pickling operations or the effluents of metal finishing processes may need a preliminary treatment step such as precipitation with lime, or evaporation. Again, any larger solid pieces of scrap are preferably broken up into finer form as a preliminary step to facilitate the chemical treatment.

The present invention in general provides a process for the recovery of constituents from nickel alloy scrap which comprises dissolution of the major constituents of the scrap in hydrochloric acid and/or chlorine gas in aqueous medium, and removal of the major constituents from the solution separately or in combination by wet chemical methods.

It is a primary object of this invention to provide techniques for recovery of constituents of nickel alloy scrap which is extremely efficient and which take into account the specific reactants and their relationship to each other and to the possible combination of metal values in the starting material. This objective includes the use of a hydrochloric acid dissolution step and magnesium oxide precipitation steps wherein both the hydrochloric acid and the magnesium oxide are regenerated and recycled for dissolution and precipitation during processing of further quantities of nickel alloy scrap.

Preferred method steps include chromium and iron removal by hydroxide precipitation, cobalt separation by solvent extraction, nickel separation by hydroxide precipitation, and regeneration of reagents. Other steps include removal of molybdenum (if any) for example by use of active charcoal or by solvent extraction.

It is possible to precipitate all the chromium and nickel as hydroxides and to separate them by hydrogenating a mixture of the metal hydroxides at elevated temperature and pressure, e.g., at 150–250° C. and 200–600 pounds per square inch to achieve selective reduction of the nickel hydroxide to metallic nickel. This method of separating nickel and chromium values is described in pending British patent application No. 16,592/67. If cobalt is present during the hydroxide precipitation, it will be separated in combination with the nickel and such a combination may be useful for alloying purposes.

A possible separation procedure involves evaporation of the solution formed by dissolution of the major constituents, said evaporation leading to formation of crystals of the respective metal chlorides.

Alternatively, crystals of anhydrous chlorides can be precipitated by passing hydrogen chloride gas into the solution. The chloride crystals can be subjected to low temperature hydrolysis whereby the chromium, molybdenum and iron salts are rendered insoluble while the nickel and cobalt salts are unaffected and can be recovered by dissolving in water. The hydrolysis is carried out at temperatures in the range 100–200° C., preferably in the range 175–190° C. and in atmospheres of air containing steam. The cobalt may be separated from nickel by solvent extraction and the nickel recovered by precipitation with alkali. The water-insoluble residue from low temperature hydrolysis can be reacted with alkali under pressure to recover molybdenum and chromium after separating the two by known chemical techniques.

The preferred method (I) of the invention comprises:
(a) Pretreatment of the scrap (if necessary).
(b) Dissolution of the major constituents in hydrochloric acid and/or chlorine gas in aqueous medium.
(c) Removal of molybdenum (if any).
(d) Removal of chromium, and of iron (if any) by hydroxide precipitation at pH 2–4.
(e) Removal of cobalt by solvent extraction.
(f) Removal of nickel by hydroxide precipitation at pH 7.5–8.
(g) Regeneration of hydrochloric acid and alkali.

In a variation (II) of this preferred method, particularly useful when no substantial amount of iron is present, step (e) may precede step (d).

In another embodiment III of the invention, steps (a), (b) and (c) are followed by step (e), and then the chromium and nickel are precipitated as a mixture of hydroxides which is hydrogenated at elevated temperature and pressure to achieve selective reduction of the nickel hydroxide to metallic nickel. Chromium is recovered from the hydroxide, and regeneration step (g) is added.

In variation IV of the method, the procedure of embodiment III is followed except that step (e) is omitted. Nickel and cobalt metal are recovered in combination in this method.

The invention will be particularly described with reference to methods I and II above, but where other embodiments of the invention use similar steps the comments will generally be applicable.

The invention will also be described with reference to the flow sheet of FIGS. 1 and 2.

FIG. 1 is a simplified flow sheet showing the steps of method I as they are carried out in the most preferred procedure. FIG. 2 is a more complete flow sheet showing the steps of method I together with the auxiliary processing and recycling steps.

Although iron is generally not a major constituent of high-temperature creep resistant alloys or Nimonic alloys, small amounts of iron will often be present in solutions obtained by dissolving such alloys in acid or other media. Often iron-bearing materials may contaminate a scrap charge or otherwise be mixed with alloy scrap and this will result in the production of solutions containing iron. For this reason, the deportment or distribution of iron during the process steps is of some importance and will be referred to in the appropriate part of the description.

In one more particular form of the invention then, the scrap is dissolved in hydrochloric acid whereafter chromium, iron, and nickel can each be precipitated as hydroxide from an aqueous chloride solution. It can be noted that the general method of precipitating a metal from solution as the metal hydroxide is also applicable to cobalt in solution although in the particular form of the invention as described, cobalt is shown as being removed from solution by a solvent extraction method. Preferably, the precipitant for this purpose is magnesium oxide, whereby the resultant solution or filtrate after such precipitation consists essentially of magnesium chloride. This solution can be processed by known methods of high temperature decomposition or hydrolysis to form magnesium oxide and hydrochloric acid. Thus when the final solution from metal precipitation is decomposed in this manner, the magnesium oxide can be returned to the process as precipitant of metallic hydroxides, and the hydrochloric acid can be returned for dissolution of further scrap material.

It should be mentioned that the addition of some salts can facilitate the high temperature decomposition or hydrolysis of magnesium chloride solutions or alternatively, may increase the yield of products of a given temperature of decomposition. One such salt is calcium chloride. The addition of such a salt although not detailed in the specification can be made with some benefit. Such recycling of the dissolution and precipitation reagents is a significant feature of the present invention.

In the dissolution step, the scrap material, in suitable physical form, is treated with an appropriately heated liquor containing hydrochloric acid and other chlorine ions by either allowing the circulating solution to percolate over the scrap contained in a suitable tower, or by contacting the scrap alloy in a tank or vat with the hot solution. In a preferred procedure, the liquor is circulated upwardly through the scrap, which facilitates removal of fine materials at the top of the tower. For example, Nimonic alloys are dissolved by treating them with hydrochloric acid of strengths within the range 5% to 35% on a weight basis at temperatures between 80° C. and the boiling point of the solution. Similarly, the scrap may be dissolved by treating it with chlorine gas and aqueous liquid. Thus by irrigating the scrap in a tower with water and passing chlorine gas through the scrap, the scrap may be dissolved and the metal chlorides formed will dissolve in the water. The reaction with chlorine gas may also take place in the presence of hydrochloric acid.

TABLE I.—DISSOLUTION RATES FOR NIMONIC ALLOYS

| | Temperature of reaction, ° C. | Dissolution rate, gms./cm.²/hr. |
| --- | --- | --- |
| Dissolution conditions: | | |
| 5% HCl | (¹) | 2–25×10⁻³ |
| 20% HCl | (¹) | 2.7–35×10⁻³ |
| 35% HCl | (¹) | 12–54×10⁻³ |
| Cl₂ gas | 20–90 | 3.3–30×10⁻³ |
| Cl₂ gas plus 5% HCl | 20–90 | 12–50×10⁻³ |
| Cl₂ gas plus 10% HCl | 20–90 | 30–100×10⁻³ |

¹ Boiling point.

It has also been found that the addition of magnesium chloride to the liquors used for dissolution of alloy scrap will materially increase the dissolution rate of the scrap and, as magnesium chloride has a beneficial effect in the solvent extraction step described later for cobalt removal, additional advantages will be derived by adding the magnesium chloride at this stage.

During the dissolution step it may be found that certain alloy constituents are insoluble under the dissolution conditions. For example titanium dioxide can often be deposited from solution during the process, an intermetallic compound of nickel and aluminium, $Al_3Ni$, is insoluble, and niobium is often found in insoluble residues from dissolution. These insoluble materials, together with contaminants derived from the scrap, such as grinding dust or foundry sand, are removed by filtration and the cooled filtrate is passed in a clarified condition to a further step in which molybdenum is removed.

Molybdenum is removed by treating the solution with activated carbon. This is conveniently achieved by passing the solution through a column of activated carbon when only molybdenum and small amounts of aluminium, niobium and titanium are absorbed. After the column has been loaded with molybdenum, the metal chloride solution remaining in the column is washed out with water and the molybdenum may be eluted with alkali (e.g., sodium or ammonium hydroxide) solution to give a molybdate solution.

It has been found that the molybdenum in solution should preferably be in an oxidized or higher valency state for efficient removal of the molybdenum by activated carbon. Thus, if the alloy has been dissolved by a method in which chlorine gas has been used, then molybdenum may be removed from solution by activated carbon without any further chemical treatment. On the other hand, if the alloy has been dissolved by contact with hydrochloric acid such that the solution is in a reduced state, then it is preferable to oxidize the solution to increase the amount of molybdenum removed. An eminently suitable method of oxidation is to treat the solution with chlorine gas to obtain the solution and hence the molybdenum in a suitable oxidized state for treatment with activated carbon. It will be noted that the chlorine gas used in this oxidation treatment is not lost to the process since a substantial part of the value of the chlorine is recovered in subsequent stages of the process as hydrochloric acid. This method is shown in FIG. 2 which shows a chlorinator for chlorination of the solution and a filtration through carbon before the molybdenum removal step.

Any suitable method of operating a series of absorption columns may be employed for molybdenum removal whereby one or more columns are washed and eluted with sodium hydroxide solution while others remain on an absorption cycle.

The sodium molybdate solution may be treated in an appropriate manner to produce suitable molybdenum compounds. For example, calcium chloride can be used to precipitate calcium molybdate.

An alternative reagent for the elution of molybdenum from the carbon column would be ammonium hydroxide, in which case, ammonium molybdate would be formed. This is shown in FIG. 2.

Although the above step for the removal of molybdenum is much preferred, it is also possible to remove the molybdenum by another suitable method such as solvent extraction using a solvent such as tributyl phosphate. A counter current extraction process, using for example mixer settler units, would be suitable.

After removal of molybdenum in the form of compounds suitable for reuse of such constituent, the substantially molybdenum-free solution can be treated for removal of chromium and iron present in solution. The chromium is precipitated, together with the greater part of the iron, by the addition of suitable alkali, e.g., an alkali metal carbonate or hydroxide, or an alkaline earth metal carbonate, oxide or hydroxide, such as solid calcium carbonate or preferably magnesium oxide. It is important that the chromium and ferric hydroxides be precipitated at a pH value in the range 2.0–4.0 in order to keep the nickel in solution as far as possible and, for this purpose, the proportions of added alkali are carefully controlled. Normally, the proportions are roughly stoichiometric. Other metals which may also be precipitated with chromium hydroxide include, in addition to iron as noted above, nickel, aluminium, titanium, silicon and possibly manganese.

The efficiency of separation of chromium from solution containing chromium and nickel at different pH values is indicated by the following table:

TABLE II.—PRECIPITATION OF CHROMIC HYDROXIDE

| | | Distribution of Metals | | | |
|---|---|---|---|---|---|
| | | Precipitate | | Filtrate and washings | |
| | pH | Percent Ni | Percent Cr | Percent Ni | Percent Cr |
| Precipitant: | | | | | |
| CaCO³ solid [1] | 3.5 | 13.9 | 99.7 | 86.1 | 0.3 |
| MgO slurry [2] | 3.1 | 5.6 | 90.0 | 94.4 | 10.0 |
| MgO slurry [2] | 3.3 | 4.9 | 94.8 | 95.1 | 5.2 |
| MgO slurry [2] | 3.5 | 8.3 | 94.5 | 91.7 | 5.5 |
| MgO slurry [2] | 3.7 | 9.6 | 99.7 | 90.4 | 0.3 |

[1] Feed solution analysis 53.8 g./l. Ni, 13.3 g./l. Co, 13.8 g./l. Cr.
[2] Feed solution analysis 68.5 g./l. Ni, 20.0 g./l. Cr. pH values measured on cooled solutions.
NOTE.—All precipitations carried out at boiling point.

In any event following such precipitation, the chromium hydroxide and ferric hydroxide precipitate is filtered off and the metals or other compounds recovered by any suitable means.

During the precipitation of chromium hydroxide from solution, a major proportion of the iron will also be precipitated, the exact amount depending upon the experimental conditions and particularly pH. However, any iron not precipitated or removed at this stage will be removed during the subsequent solvent extraction step for removal of cobalt as described later.

The chromium hydroxide precipitate will also contain occluded or entrained cobalt or nickel compounds and these may be removed to a large extent by washing the precipitate. In FIG. 2, for example, the chromium hydroxide precipitate is removed by filtration and the filter cake is repulped with water and refiltered. The secondary filtrate so obtained is shown as combining with the main filtrate from chromium hydroxide precipitation.

The method of working up the chromic hydroxide precipitate into marketable or useful compounds has not been given as the method of preparation of chromium-containing chemicals such as pure chromic oxide, chromates, dichromates and chromic acid is well known. Any method of working up the chromic hydroxide into chromium containing chemicals should preferably incorporate provision for the recovery of any nickel, cobalt or other valuable metals which may be occluded or entrained in the chromic hydroxide. As shown in FIG. 2, the method includes leaching with alkali under pressure in an autoclave, followed by filtration, the chromium being recovered as sodium chromate and the nickel and cobalt hydroxide being treated with HCl so as to be returned to the main line as chlorides.

Continuing to cobalt removal following the above described method for removal of chromium together with most of the iron, the preferred solvent extraction process must be carried out in acidic chloride conditions to ensure the presence of an ionic cobalt chloride complex. The chloride ion concentration may be increased with advantage by adding up to 150 g./litre of sodium chloride, or the equivalent amount of calcium chloride or magnesium chloride. The cobalt chloride complex may be extracted by any suitable means which selectively extracts the complex cobalt anion. Preferably, it is extracted by a solution of long chain tertiary amines in a suitable aromatic solvent such as xylene or tetralin. The loaded solvent is stripped with suitable amounts of water to give a pure and nearly neutral solution of cobalt chloride. This solution may be treated in any appropriate manner to produce cobalt, or it may be treated with magnesium oxide to precipitate cobalt hydroxide which is filtered off and the cobalt recovered as appropriate, such as by hydrogen reduction.

An alternative method of treating the cobalt strip solution which consists essentially of a cobalt chloride solution is to treat the solution reduced to a suitable volume by concentration if necessary, but by thermal decomposition or hydrolysis to form cobalt oxide and hydrochloric acid. The former material can be treated in a suitable manner to produce metal or other marketable product while the hydrochloric acid can be recycled to the process step of alloy dissolution. In FIG. 2, the cobalt strip solution shown as passing to a roaster, e.g., an Aman Roaster, where it is subjected to high temperature hydrolysis to yield cobalt oxide and HCl.

Any ferric iron remaining in solution after the precipitation of chromium and most of the iron will also be extracted into the solvent phase but by suitable adjustment of the volume of water used for stripping the cobalt compounds from the loaded organic phase, the cobalt can be removed substantially free from iron. Small amounts of iron remaining in the organic solvent can be removed finally by contacting the solvent with large amounts of water when iron is extracted into the aqueous phase.

As an alternative to the above described example in which the precipitation for chromium removal precedes the solvent extraction step for cobalt separation, some advantage may be derived from the application of solvent extraction for cobalt removal before the chromium removal step. For example; if cobalt is removed from solution before chromium hydroxide precipitation, there will be no cobalt occluded or entrained in the hydroxide precipitates and hence no cobalt compounds will need to be returned to the main processing route. This will effect some reduction in processing costs.

Whichever of the above alternative sequences is adopted, the solution now free of the major constituents cobalt and chromium can be passed to a further stage where additional alkali, preferably magnesium oxide is added in sufficient quantity to bring the pH value of the solution to between 7.5 and 8.0 when nickel is precipitated as the hydroxide. The nickel hydroxide is filtered off and the metal may be recovered by any suitable means, such as by pressure hydrogen reduction or "electro-winning."

The nickel-free filtrate, consisting mainly of magnesium chloride solution together with smaller amounts of calcium chloride if this salt has been previously added, can be concentrated by evaporation and the concentrated solution thermally decomposed by high temperature hydrolysis to produce magnesium oxide and hydrochloric acid for recycling.

Regarding the accompanying drawings: these are of flowsheet form with FIG. 1 conforming generally with the process sequence I described above, and FIG. 2 relating to the same process sequence while indicating more detail, including the deportment of minor constituents. The drawings are in conventional flowsheet form well understood by those skilled in the art, and no further explanation is necessary. However, it is to be understood that such drawings are given merely by way of example since the sequence of main process steps can be varied, as already noted, in some cases, for deportment of minor constituents is dependent on small variations in process conditions, and other modifications may arise. FIG. 2 shows a pretreatment furnace which may be unnecessary, depending on the physical form of the scrap.

FIG. 2 is particularly useful in that it shows the recirculation of reagents which is possible using the method of the invention. Both the HCl used for dissolution and the MgO used for precipitation are recovered and recycled.

If calcium carbonate is used as the alkaline earth salt, it may be necessary or desirable to recover and recycle it for economic reasons.

We claim:
1. A process for the recovery of constituents from nickel alloy scrap containing nickel, cobalt and chromium together with other constituents selected from the group consisting of molybdenum, iron, aluminum, titanium, manganese, silicon, tungsten, carbon, copper and niobium and mixtures of the same which comprises
  (a) contacting the scrap with an aqueous medium containing hydrochloric acid to dissolve metal values therefrom;
  (b) effecting steps (i) and (ii) in either order:
    (i) adding to the aqueous solution magnesium oxide until a pH value of 2 to 4 is attained, whereby chromium and any iron is precipitated, and thereafter separating the precipitate from the aqueous liquid phase;
    (ii) effecting a liquid-liquid extraction, between an aqueous phase and an organic phase, upon the system under acidic chloride conditions whereby any acidic cobalt chloride complex formed in the aqueous phase passes into the organic phase, thereafter separating the aqueous phase;
  (c) adding to the resultant aqueous liquid phase magnesium oxide until a pH of pH 7.5 to 8 is attained whereby nickel is precipitated, and thereafter separating the precipitate from the liquid phase,
  (d) heating the liquid phase consisting essentially of magnesium chloride solution formed by the precipitation reactions to effect decomposition into magnesium oxide and hydrochloric acid,
  (e) recycling the hydrochloric acid thus produced to stage (a) to effect dissolution of a further quantity of scrap,
  (f) recycling the magnesium oxide produced to at least one of stages (b) and (c) to effect precipitation of further metals as therein defined.

2. A process as claimed in claim 1 wherein chlorine gas is incorporated at the scrap/aqueous acid contacting stage (a).

3. A process as claimed in claim 1 wherein prior to stage (b) the solution is filtered through activated carbon to remove molybdenum values.

4. A process as claimed in claim 3 wherein prior to the filtration the solution is contacted with chlorine gas to convert the molybdenum values to a higher valency state.

5. A process as claimed in claim 1 wherein the extraction stage (b)(ii) precedes the precipitation stage (b)(i); precipitation is effected to produce a mixed hydroxide precipitate containing chromium, nickel and any iron; and said mixed precipitate is heated under pressure in the presence of gaseous hydrogen to effect selective reduction of nickel.

References Cited
UNITED STATES PATENTS

| | | | |
|---|---|---|---|
| 2,694,005 | 11/1954 | Schaufelberger | 75—108 |
| 2,803,537 | 8/1957 | De Merre | 75—108 XR |
| 2,867,503 | 1/1959 | Roy | 75—108 XR |
| 3,193,381 | 7/1965 | George et al. | 75—108 |
| 3,196,005 | 7/1965 | Moore | 75—108 |
| 3,224,874 | 12/1965 | Daugherty | 75—108 |
| 3,251,650 | 5/1966 | Bengston et al. | 23—201 |

EDWARD STERN, Primary Examiner

U.S. Cl. X.R.
75—119; 23—87, 91, 145, 183, 200, 312